United States Patent
Nakajima

(10) Patent No.: US 7,158,124 B2
(45) Date of Patent: Jan. 2, 2007

(54) TOUCH PANEL INCLUDING EXTERNAL CONNECTION TERMINAL PLACED WITHIN OUTLINE OF TOUCH PANEL BODY PROVIDED WITH HANDLE PORTION

(75) Inventor: Takashi Nakajima, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 280 days.

(21) Appl. No.: 10/372,174

(22) Filed: Feb. 25, 2003

(65) Prior Publication Data

US 2004/0070572 A1 Apr. 15, 2004

(30) Foreign Application Priority Data

Oct. 11, 2002 (JP) .............................. 2002-298850

(51) Int. Cl.
*G09G 5/00* (2006.01)
(52) U.S. Cl. ........................ 345/173; 345/179; 349/150
(58) Field of Classification Search ........ 345/173–174, 345/204–206; 364/681
See application file for complete search history.

(56) References Cited

U.S. PATENT DOCUMENTS

| 6,104,464 | A * | 8/2000 | Adachi et al. ............... 349/150 |
| 6,552,718 | B1 * | 4/2003 | Ahn et al. ................... 345/173 |
| 6,670,949 | B1 * | 12/2003 | Ahn et al. ................... 345/173 |
| 6,788,297 | B1 * | 9/2004 | Itoh et al. .................... 345/179 |
| 2002/0089492 | A1 * | 7/2002 | Ahn et al. |
| 2003/0011575 | A1 * | 1/2003 | Matsuda et al. |

* cited by examiner

*Primary Examiner*—Sumati Lefkowitz
*Assistant Examiner*—Tammy Pham
(74) *Attorney, Agent, or Firm*—Staas & Halsey LLP

(57) ABSTRACT

External connection terminals are placed within an outline of a touch panel body by being concentrated in an area neighboring an edge of a touch panel body on one of an upper surface and an under surface thereof. When the external connection terminals are concentrated on a side end surface of the touch panel body, the external connection terminals are also placed within the outline of the touch panel body. The touch panel body is also provided with a handle portion.

13 Claims, 19 Drawing Sheets

TOUCH PANEL INCLUDING EXTERNAL CONNECTION TERMINAL PLACED WITHIN OUTLINE OF TOUCH PANEL BODY PROVIDED WITH HANDLE PORTION

BACKGROUND OF THE INVENTION

1. Field of the Invention

The present invention generally relates to a touch panel and a touch panel apparatus, and more particularly, to a touch panel and a touch panel apparatus provided on-screen in an apparatus, such as a personal computer, a word processor or an electronic notebook, for inputting data.

2. Description of the Related Art

As shown in FIG. 1, a conventional touch panel 10 has a structure in which an extension cable 12 extends from a touch panel body 11. The extension cable 12 is a flexible cable, and is joined to the touch panel body 11. The extension cable 12 includes terminal portions 13 aligned at an end thereof.

As shown in FIG. 2, the touch panel 10 is incorporated in an information communication apparatus 20. The end of the extension cable 12 is inserted and connected into a connector 22 of a control circuit board unit 21. The touch panel body 11 is placed over an upper surface of a liquid crystal panel 23, and is surrounded and pressed by a case 24.

Upon assembling the information communication apparatus 20, and upon exchanging the touch panel 10 out of order, an operator inserts the end of the extension cable 12 into the connector 22 by holding the touch panel body 11 by one hand 30 and picking the end of the extension cable 12 by other hand 31, as shown in FIG. 3. This insertion operation is troublesome, inhibiting assembly and maintenance of the information communication apparatus 20.

In addition, upon taking up the touch panel 10 laid on a table, the extension cable 12 may often be gripped and pulled up. In this course, a force is exerted on a part 14 at which the extension cable 12 is joined to the touch panel body 11, causing a risk of damaging the part 14.

SUMMARY OF THE INVENTION

It is a general object of the present invention to provide an improved and useful touch panel and a touch panel apparatus in which the above-mentioned problems are eliminated.

A more specific object of the present invention is to provide a touch panel and a touch panel apparatus which can be assembled and maintained easily without damaging the touch panel.

In order to achieve the above-mentioned objects, there is provided according to one aspect of the present invention a touch panel including external connection terminals provided on one of an upper surface, an under surface and a side end surface of a touch panel body so as to be placed within an outline of the touch panel body.

According to the present invention, the external connection terminals and terminal portions of a cable extending from a control circuit and so forth can be electrically connected to each other with a pressure exerted on the touch panel. Accordingly, an incorporation of the touch panel into a touch panel apparatus and a maintenance of the touch panel apparatus with replacing the touch panel can be performed easily.

In order to achieve the above-mentioned objects, there is also provided according to another aspect of the present invention a touch panel including a handle portion provided on a touch panel body.

According to the present invention, the touch panel laid on a table can be picked up with ease by utilizing the handle portion.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 4:
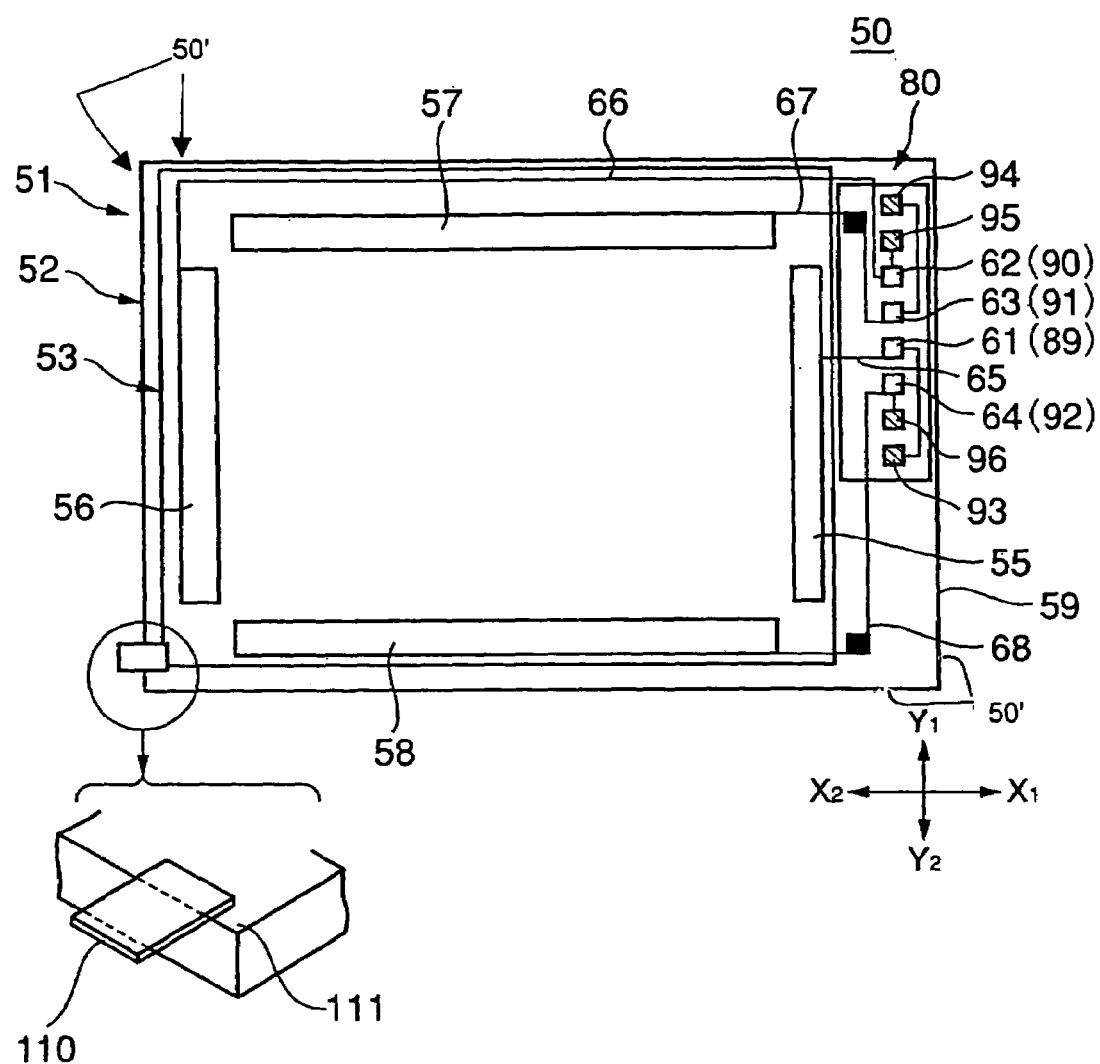
FIG. 4 is a plan view of a touch panel according to a first embodiment of the present invention.
Figure 5:
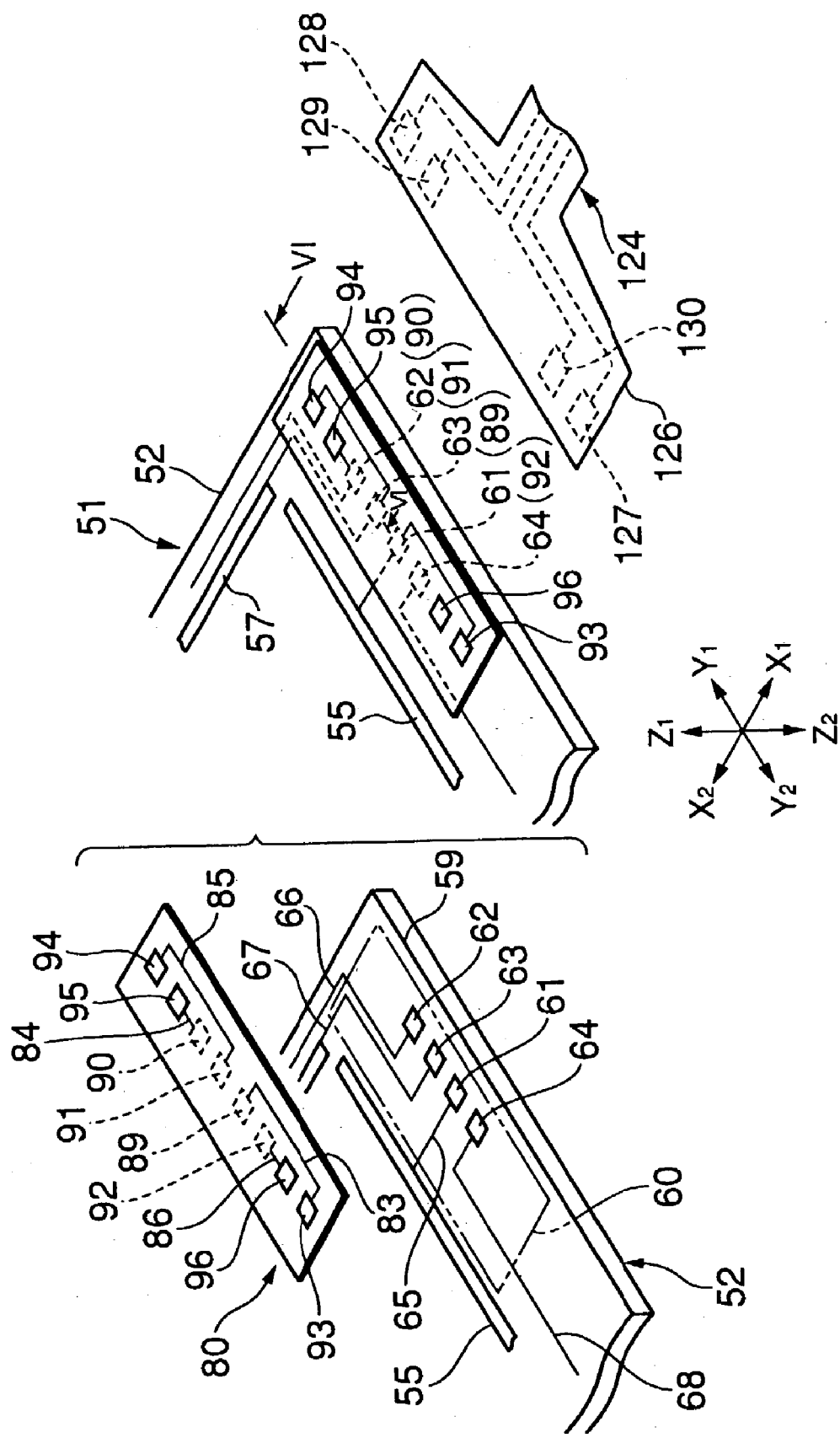
FIG. 5 is a magnified view of a part of the touch panel shown in FIG. 4.
Figure 6:
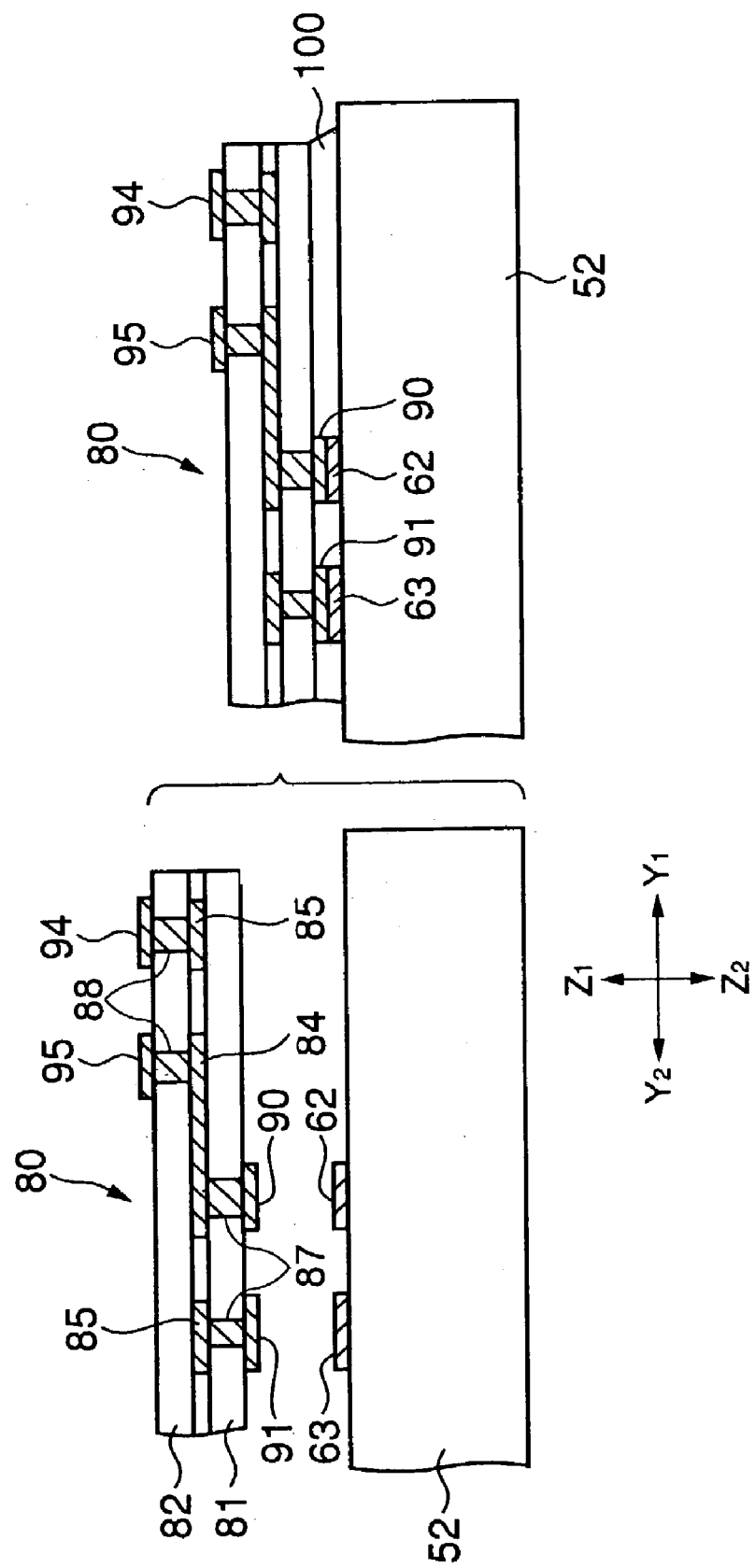
FIG. 6 is a cross-sectional view taken along a line VI in FIG. 5.

FIG. 4 is a plan view of a touch panel 50 according to a first embodiment of the present invention. FIG. 5 is a magnified view of a part of the touch panel 50 shown in FIG. 4. FIG. 6 is a cross-sectional view taken along a line VI in FIG. 5.

The touch panel 50 includes a touch panel body 51, an external connection terminal member 80, and a handle member 110.

Figure 7:
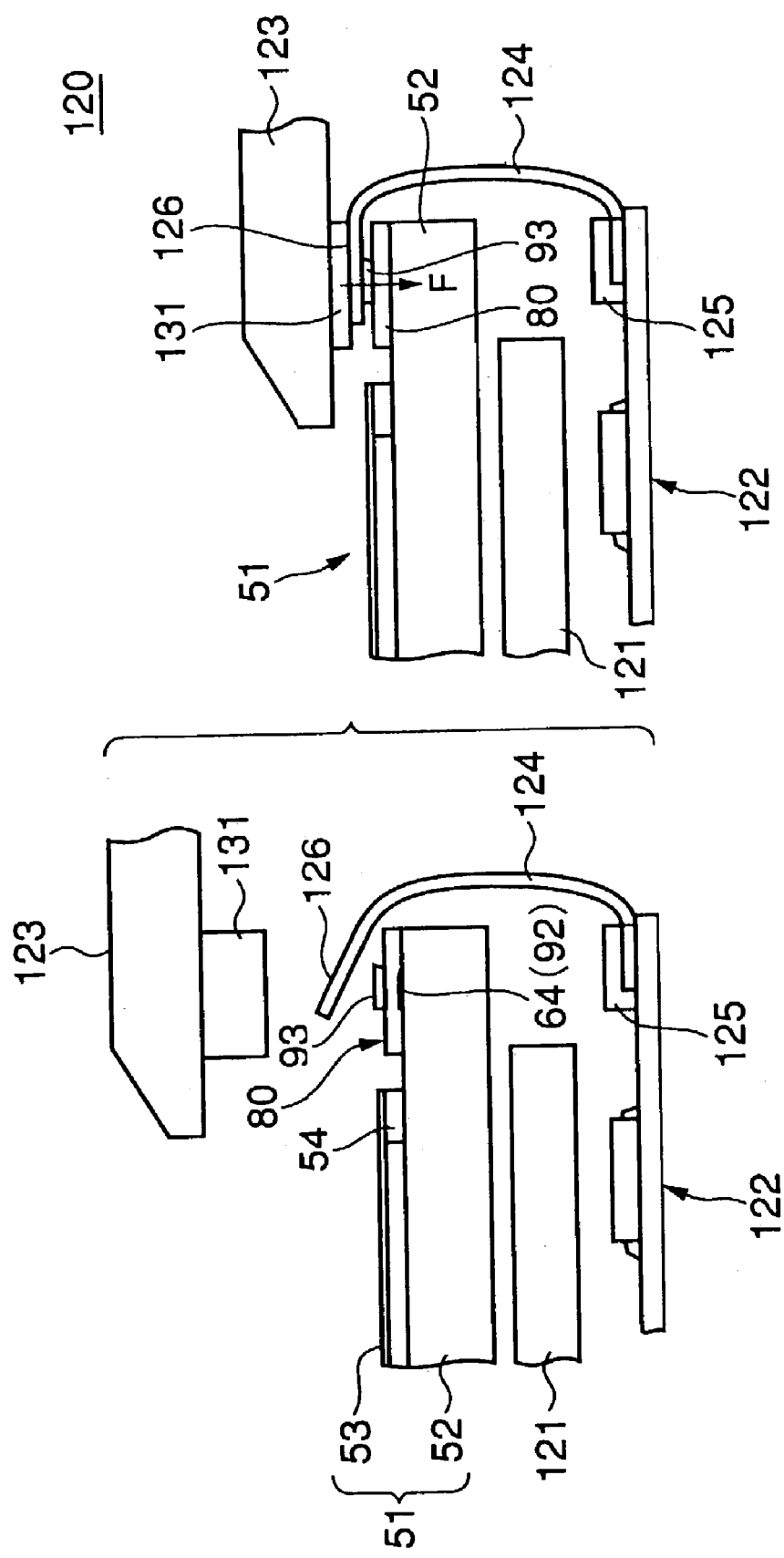
FIG. 7 is a cross-sectional view of a part of an information communication apparatus including the touch panel shown in FIG. 4.

The touch panel body 51 has a structure in which a film 53 is joined on an upper surface of a glass plate (or a plastic plate) 52 with a periphery of the film 53 being joined thereto by a two-sided tape 54, as shown in FIG. 7. The film 53 forms, i.e., provides, a face on which an input operation is performed. Electrode patterns 55 and 56 are formed on the glass plate 52; the electrode patterns 55 and 56 oppose each other in direction X1–X2. Electrode patterns 57 and 58 are formed on the film 53; the electrode patterns 57 and 58 oppose each other in direction Y1–Y2. On the upper surface of the glass plate 52, four terminal portions 61 to 64 are formed at a part 60 in the vicinity of an edge 59 located in direction X1. The four terminal portions 61 to 64 are aligned in direction Y1–Y2. Also, wiring patterns 65 to 68 are formed on the upper surface of the glass plate 52. The wiring patterns 65 and 66 extend from the electrode patterns 55 and 56 to the terminal portions 61 and 62, respectively. The wiring patterns 67 and 68 extend from the electrode patterns 57 and 58 to the terminal portions 63 and 64, respectively. Each of the wiring patterns 65 to 68 is covered with an insulating film. The terminal portions 61 to 64 are formed by printing Ag, and are thus made of Ag prone to oxidation; therefore, the terminal portions 61 to 64 need to be protected.

The external connection terminal member 80 has a same structure as a general flexible cable, and has a rectangular form. As shown in FIG. 6, in the external connection terminal member 80, Cu wiring patterns 83 to 86 are formed between a lower polyethylene terephthalate (PET) film 81 and an upper PET film 82; via holes 87 and 88 are formed in the PET films 81 and 82, respectively; terminal portions 89 to 92 are formed on an undersurface of the lower PET film 81; and external connection terminals 93 to 96 are formed on an upper surface of the upper PET film 82. The terminal portions 89 to 92 are arranged at positions corresponding to the terminal portions 61 to 64. The external connection terminals 94 and 95 are located toward direction Y1 on the upper surface of the upper PET film 82, and the external connection terminals 93 and 96 are located toward direction Y2 on the upper surface of the upper PET film 82. The terminal portions 89 to 92 and the external connection terminals 93 to 96 are electrically connected to each other via the wiring patterns 83 to 86 and the via holes 87 and 88. The external connection terminals 93 to 96 and terminal portions 89 to 92 are plated with solder, and thus are not prone to oxidation.

The external connection terminal member 80 structured as above is joined to the part 60 on the upper surface of the glass plate 52 by a conductive adhesive 100, and the terminal portions 89 to 92 are electrically connected to the terminal portions 61 to 64, respectively.

The external connection terminals 93 to 96 plated with solder are aligned in direction Y1–Y2 within an outline 50' of the touch panel 50 and in the vicinity of the edge 59.

As shown in FIG. 4, the handle member 110 is a small piece in the form of a film, and is joined near a corner portion 111 formed by an X2-side and a Y2-side of the touch panel body 51 so as to project from the touch panel body 51 in direction X2. The handle member 110 is joined to the touch panel body 51 by an adhesion force to a degree that the handle member 110 can be disjoined by pulling intensely.

Next, a description will be given, with reference to FIG. 7, of a state in which the touch panel 50 structured as above is incorporated in an information communication apparatus 120 that is a touch panel apparatus.

As shown in FIG. 7, the information communication apparatus 120 includes a liquid crystal panel 121, a control circuit board unit 122, a case 123 and a flexible cable 124.

One end of the flexible cable 124 is inserted and connected into a connector 125 provided on the control circuit board unit 122. A free end portion 126 of the flexible cable 124 has dimensions and a form corresponding to the external connection terminal member 80, as shown in FIG. 5, in which terminal portions 127 to 130 are arranged correspondingly to the external connection terminals 93 to 96.

As shown in FIG. 7, a seal member 131, such as a rubber or a sponge, is joined to a part of the case 123 corresponding to the external connection terminal member 80.

As shown in FIG. 7, the information communication apparatus 120 is assembled as follows: the one end of the flexible cable 124 is connected to the connector 125 beforehand; the touch panel 50 is set above the liquid crystal panel 121; the free end portion 126 of the flexible cable 124 extending from the connector 125 is positioned so as to cover the external connection terminal member 80; and the case 123 is mounted thereon by being laid over from upward.

When the case 123 is mounted on the free end portion 126 by being laid over from upward, the free end portion 126 of the flexible cable 124 is held between the touch panel 50 and the seal member 131 so that the seal member 131 is compressed, whereby the free end portion 126 is pressed against an upper surface of the touch panel 50 by an elastic force F of the seal member 131; accordingly, the terminal portions 127 to 130 are connected to the external connection terminals 93 to 96 with pressure.

Figure 1:
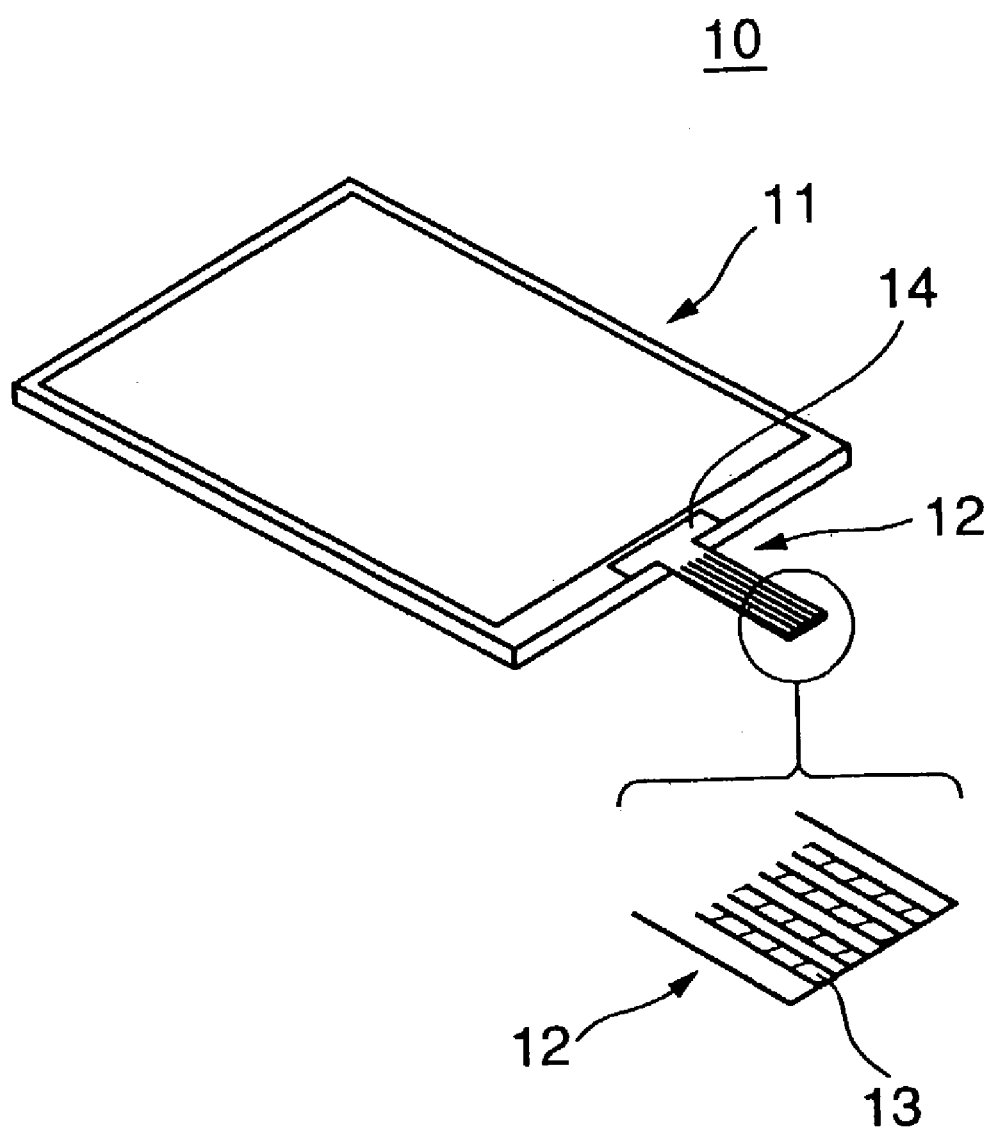
FIG. 1 is a perspective view of a conventional touch panel.
Figure 2:
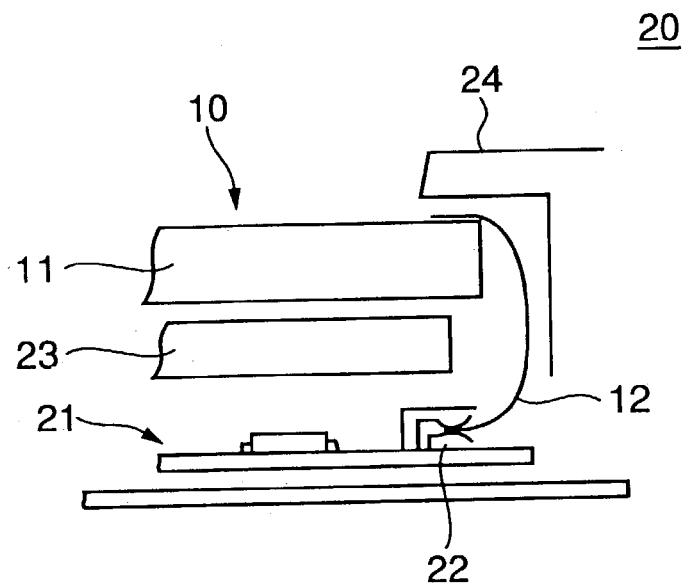
FIG. 2 is a cross-sectional view of a part of an information communication apparatus including the touch panel shown in FIG. 1.
Figure 3:
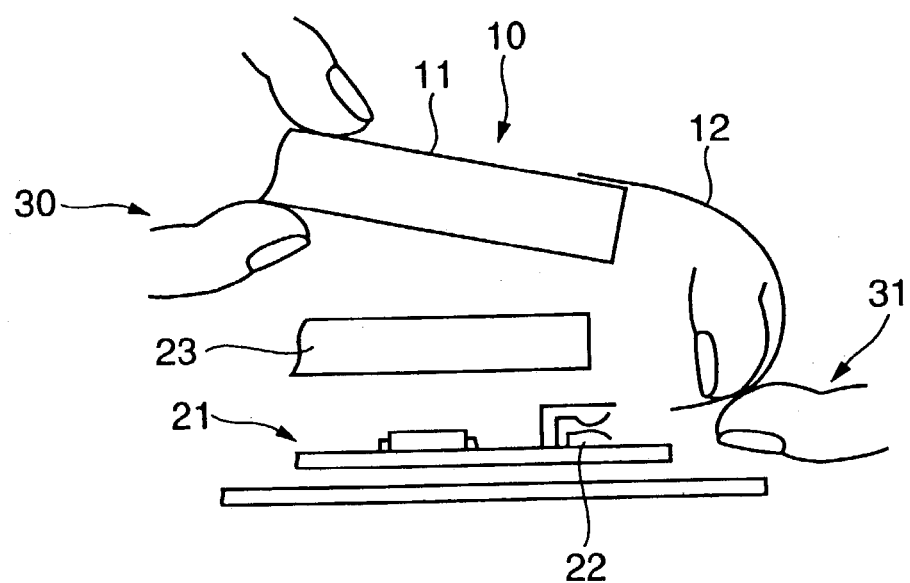
FIG. 3 is an explanatory view of mounting the touch panel shown in FIG. 1.

As described above, the touch panel 50 includes the external connection terminals 93 to 96 within the outline of the touch panel 50; the one end of the flexible cable 124 is connected to the connector 125 beforehand; and the free end portion 126 of the flexible cable 124 is connected to the external connection terminals 93 to 96 with pressure. Thus, the information communication apparatus 120 can be assembled with an excellent workability, compared with the conventional information communication apparatus 20 shown in FIG. 2 and FIG. 3.

Besides, when the case 123 is dismounted from the free end portion 126, the free end portion 126 of the flexible cable 124 is released from the pressure so as to be free; accordingly, the terminal portions 127 to 130 are disconnected from the external connection terminals 93 to 96 by being released from the pressure. Thus, a maintenance of the information communication apparatus 120 can be also performed with an excellent workability, such as when the touch panel 50 incorporated in the information communication apparatus 120 goes out of order, and needs to be replaced with the new touch panel 50.

In addition, upon taking up the touch panel 50 laid on a table, an operator picks and pulls up the handle member 110 with fingertips so as to bring up an end of the touch panel 50 away from the table; thereupon, the operator can firmly hold the touch panel 50 by hand. Thus, the touch panel 50 laid on the table can be handled with ease. Picking and pulling up the handle member 110 damages no part.

When necessary, the handle member 110 may be disjoined after the touch panel 50 is set above the liquid crystal panel 121. Disjoining the handle member 110 prevents the handle member 110 from forming an obstacle.

Hereinbelow, a description will be given of other embodiments regarding the external connection terminals.

Figure 8:
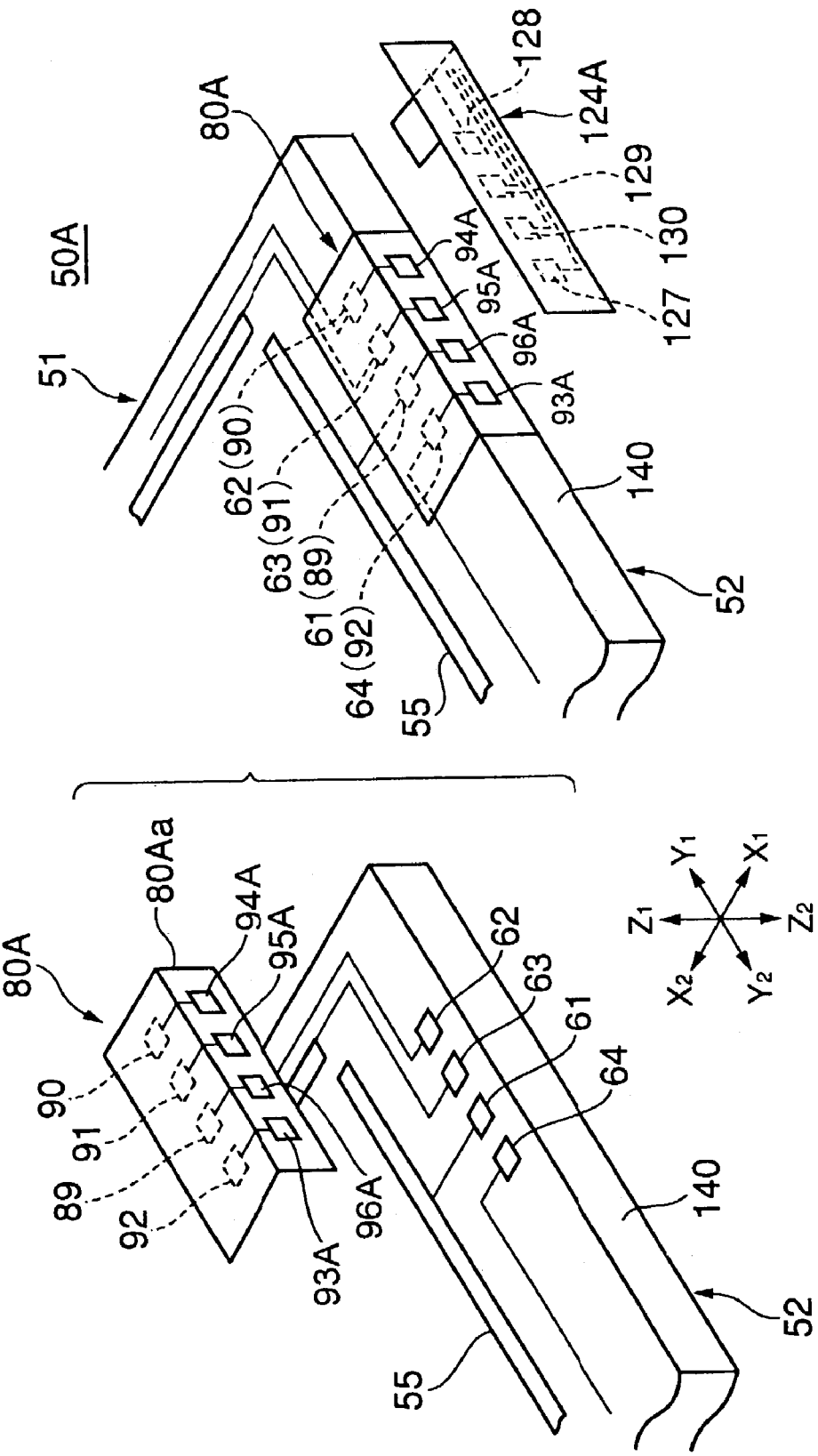
FIG. 8 is a magnified view of a part of a touch panel according to a second embodiment of the present invention.

FIG. 8 is a magnified view of a part of a touch panel 50A according to a second embodiment of the present invention. An external connection terminal member 80A included in the touch panel 50A is basically identical to the external connection terminal member 80 shown in FIG. 5 and FIG. 6 except that external connection terminals 93A to 96A are provided in line on a flap portion 80Aa formed by bending the external connection terminal member 80A in an L-shape. The external connection terminal member 80A is joined to the touch panel body 51 by a conductive adhesive; the terminal portions 89 to 92 are electrically connected to the terminal portions 61 to 64, respectively; and the flap portion 80Aa is joined to a side end surface 140 at an X1-side of the glass plate (or the plastic plate) 52. Thus, the external connection terminals 93A to 96A are aligned in direction Y1–Y2 at the side end surface 140 of the glass plate 52.

Figure 9:
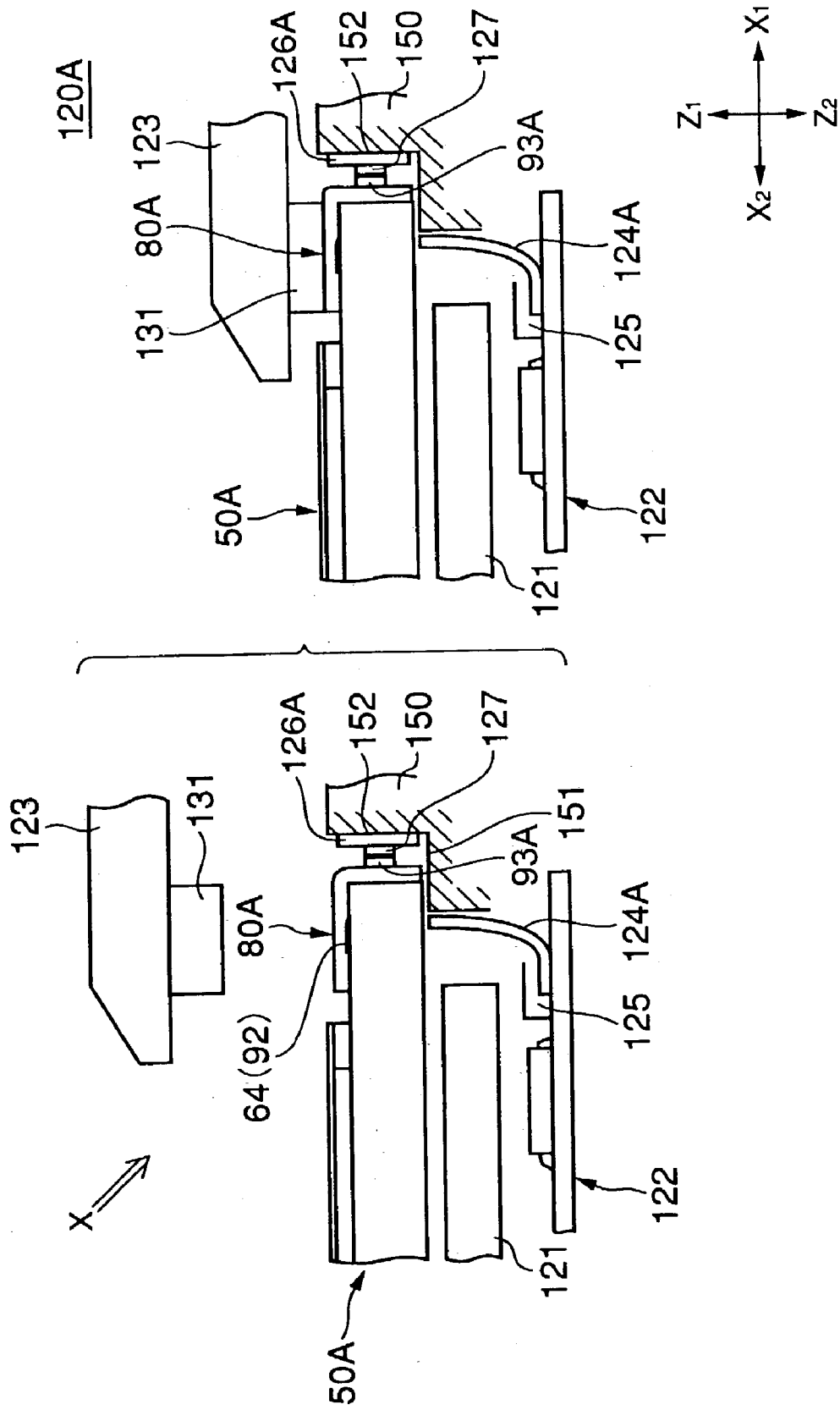
FIG. 9 is a cross-sectional view of a part of an information communication apparatus including the touch panel shown in FIG. 8.
Figure 10:
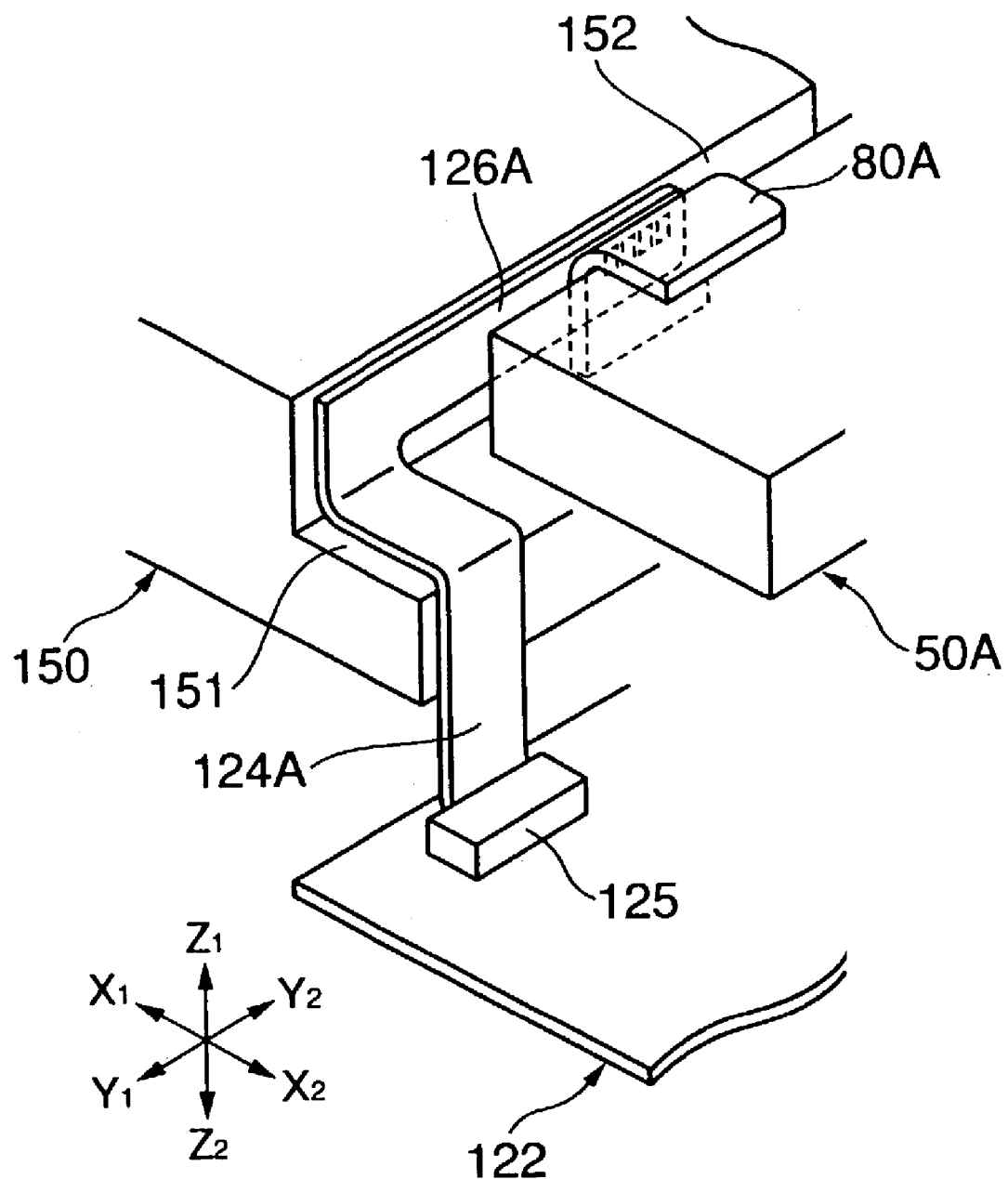
FIG. 10 is a perspective view seen in a direction indicated by an arrow X in FIG. 9.

In accordance with the touch panel 50A structured as above, an information communication apparatus 120A has a structure as shown in FIG. 9 and FIG. 10 in which a free end portion 126A of a flexible cable 124A is fixed on a rising wall 152 rising from a stage portion 151 of a housing 150 accommodating the touch panel 50A.

As shown in FIG. 9, the touch panel 50A is placed on the stage portion 151 having a frame form supporting the touch panel 50A, and is pressed against the rising wall 152 when necessary; thereby the external connection terminals 93A to 96A are connected to terminals of the free end portion 126A of the flexible cable 124A with pressure. That is, the external connection terminals 93A to 96A are electrically connected to the flexible cable 124A in the course of incorporating the touch panel 50A into the information communication apparatus 120A.

Besides, the flexible cable 124A may be replaced with a conductive pattern formed on a surface of the housing 150.

Figure 11:
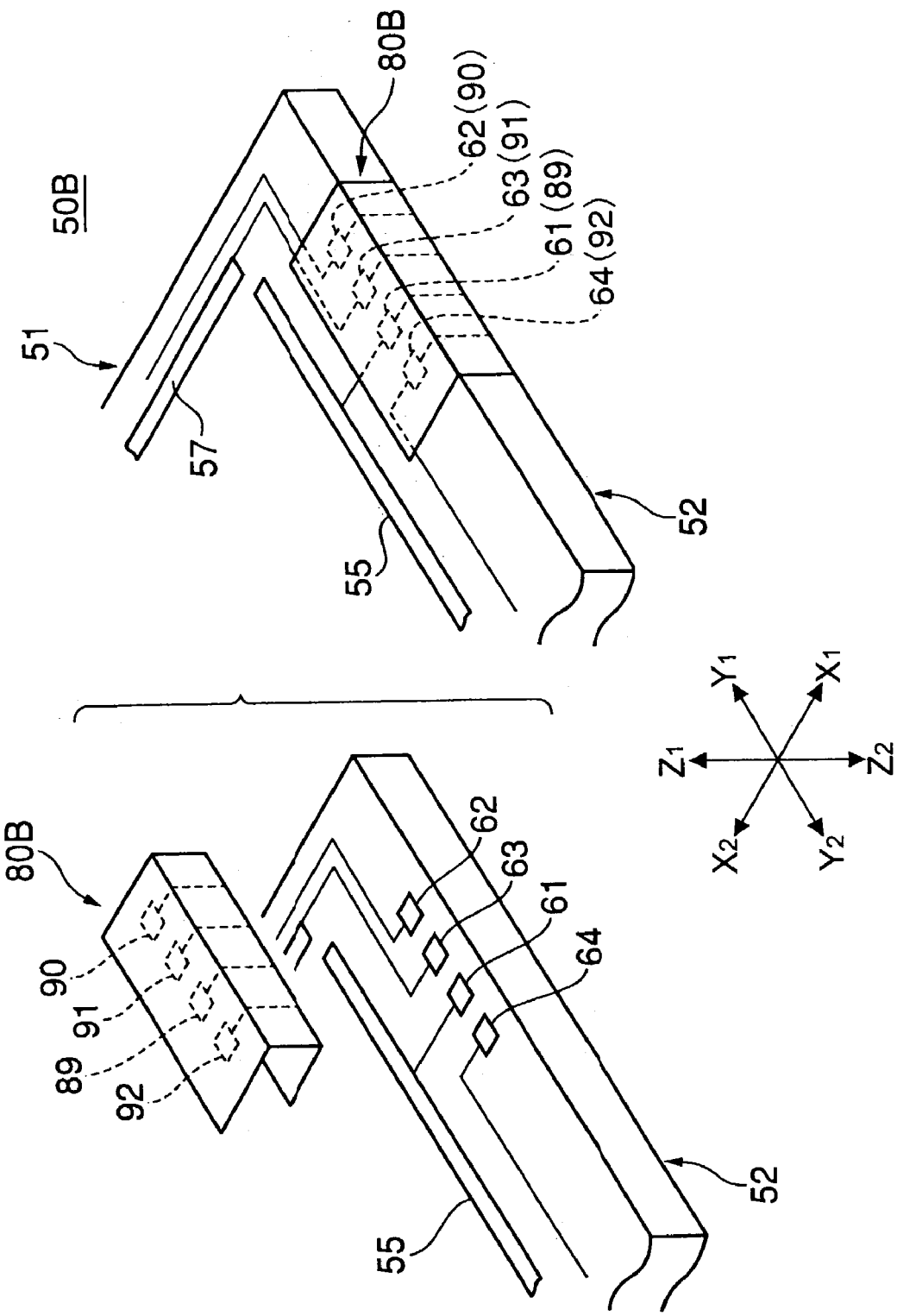
FIG. 11 is a magnified view of a part of a touch panel according to a third embodiment of the present invention.
Figure 12:
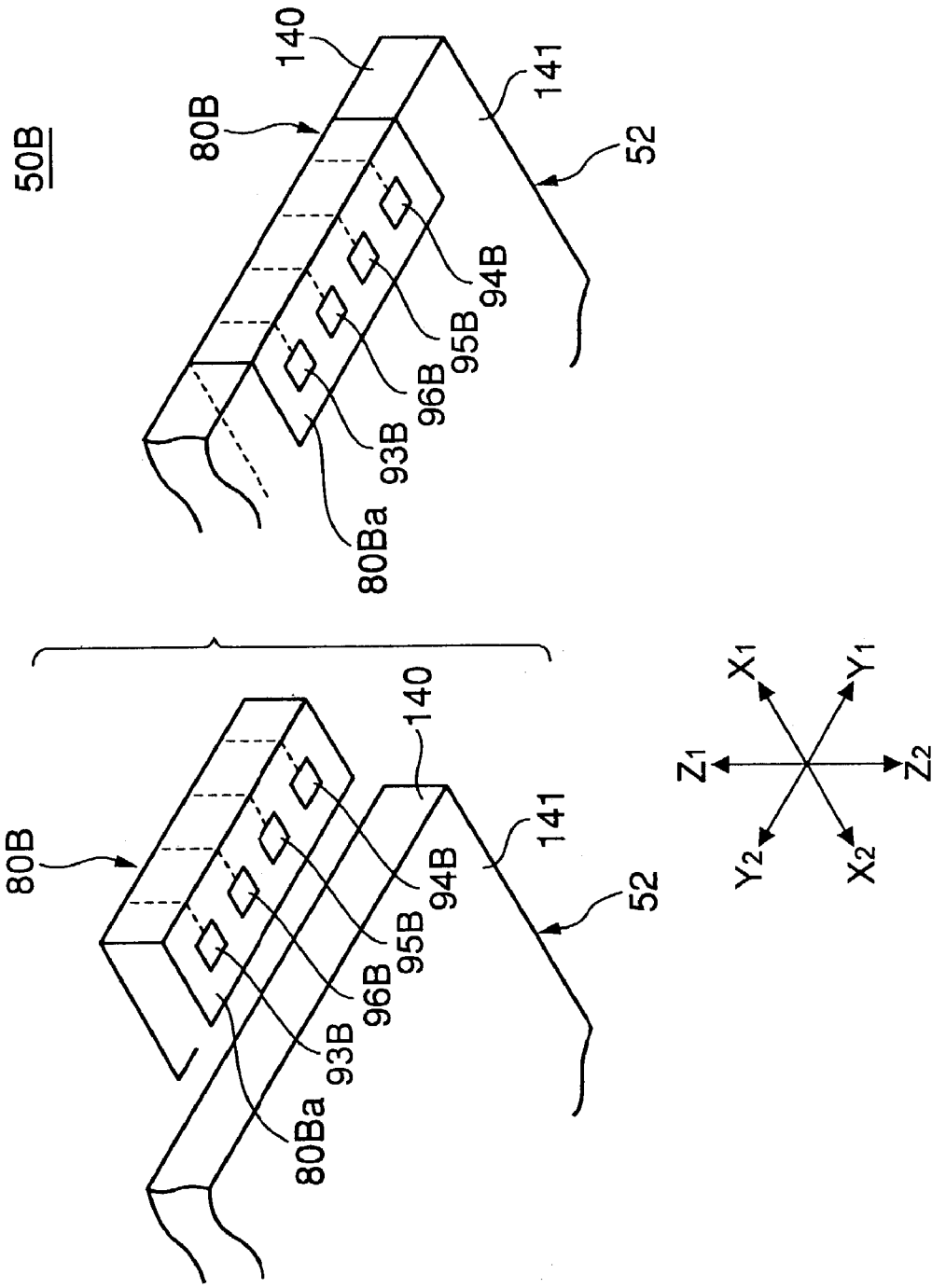
FIG. 12 is a bottom perspective view of the touch panel shown in FIG. 11.

FIG. 11 is a magnified view of a part of a touch panel 50B according to a third embodiment of the present invention. FIG. 12 is a bottom perspective view of the touch panel 50B shown in FIG. 11. An external connection terminal member 80B included in the touch panel 50B is bent into a U-shape, and external connection terminals 93B to 96B are provided in line on a flap portion 80Ba that is a turned-back portion of the U-shaped external connection terminal member 80B. The external connection terminal member 80B is joined to the touch panel body 51 by a conductive adhesive so that the external connection terminal member 80B envelops a part of an edge of the touch panel body 51 at an X1-side thereof; and the terminal portions 89 to 92 are electrically connected to the terminal portions 61 to 64, respectively. As shown in FIG. 12, the flap portion 80Ba is joined to an undersurface 141 of the glass plate (or the plastic plate) 52; thus, the external connection terminals 93B to 96B are aligned in direction Y1–Y2 at the undersurface of the glass plate 52 near the X1-side thereof.

Figure 13:
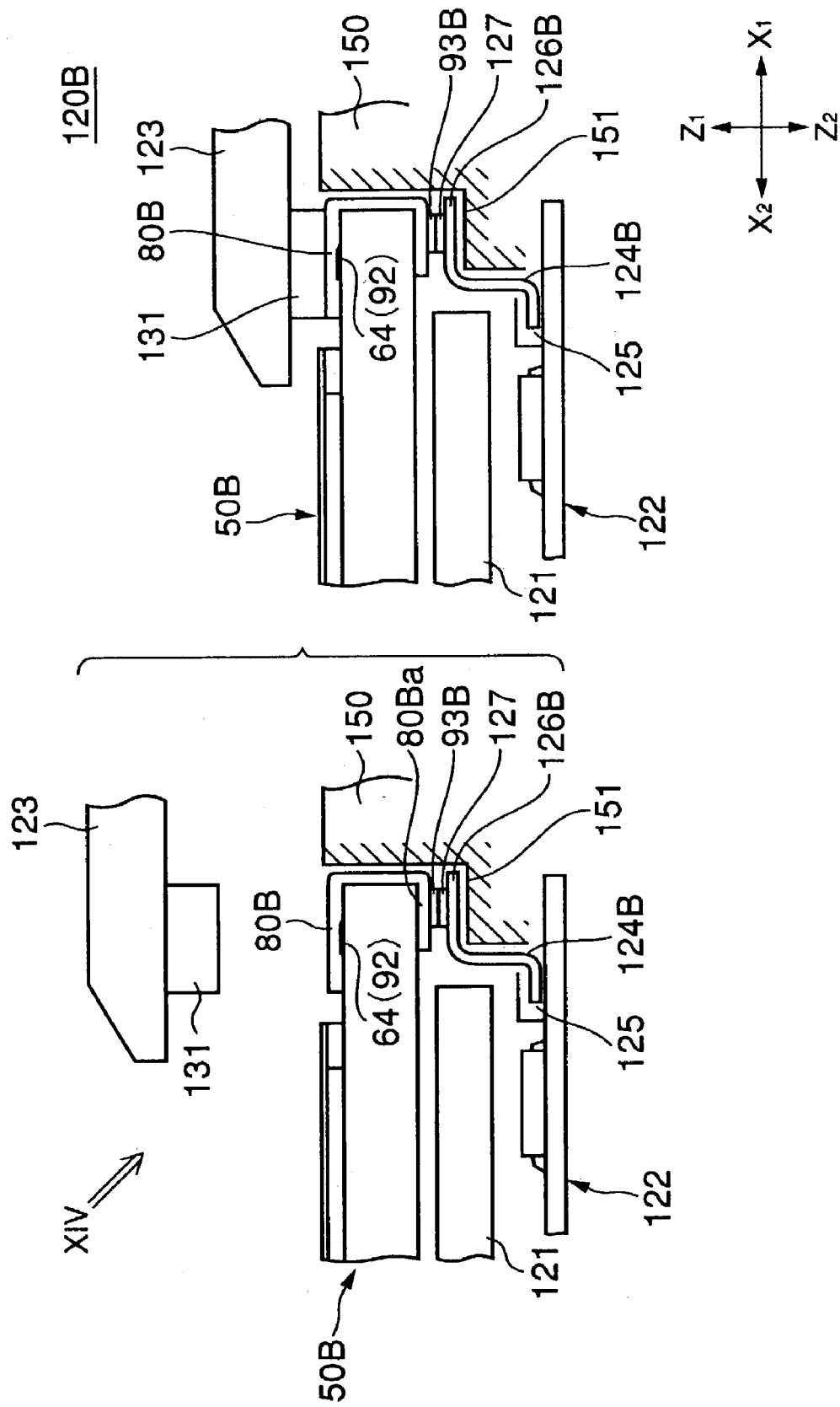
FIG. 13 is a cross-sectional view of a part of an information communication apparatus including the touch panel shown in FIG. 11 and FIG. 12.
Figure 14:
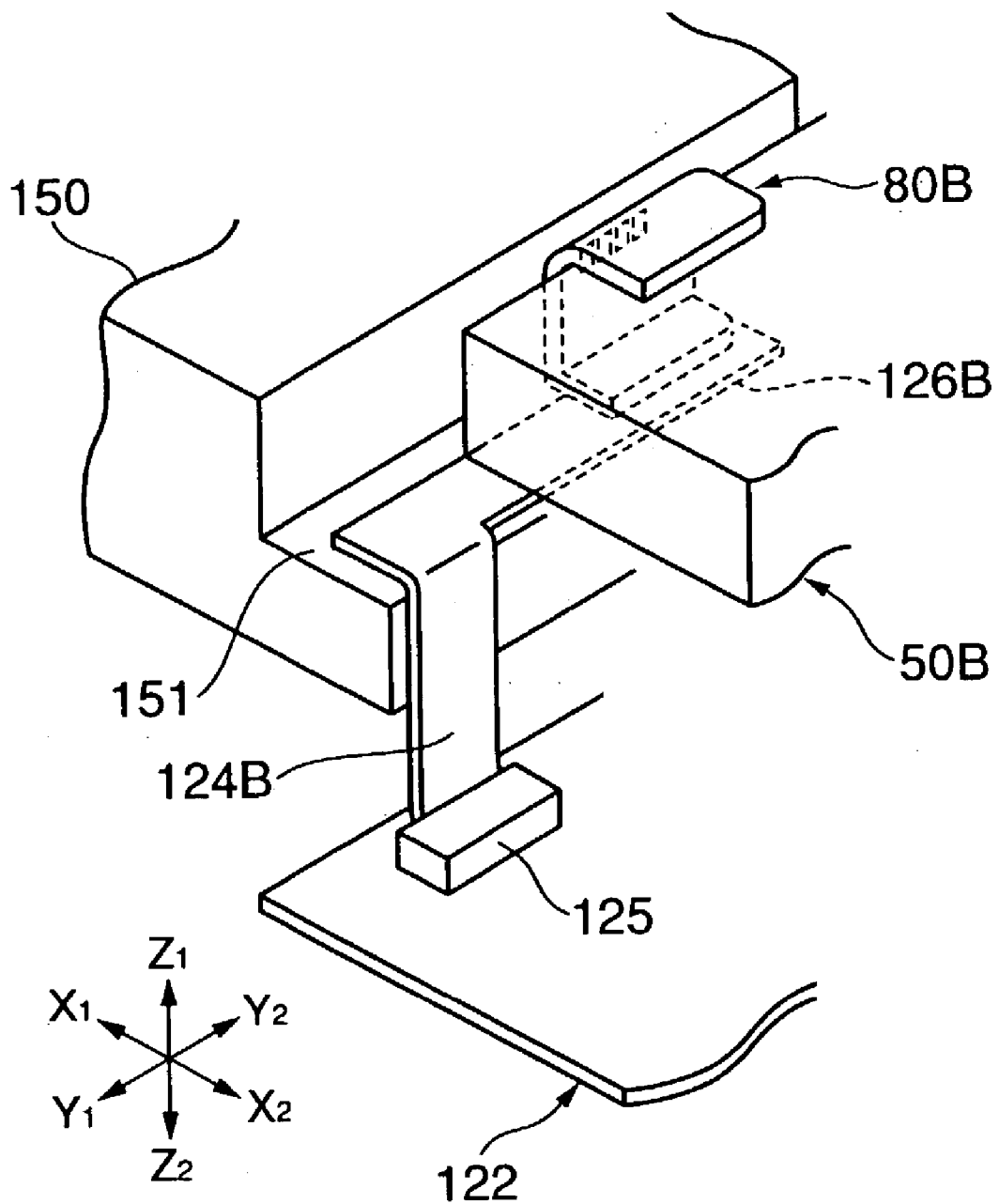
FIG. 14 is a perspective view seen in a direction indicated by an arrow XIV in FIG. 13.

In accordance with the touch panel 50B structured as above, an information communication apparatus 120B has a structure as shown in FIG. 13 and FIG. 14 in which a free end portion 126B of a flexible cable 124B is fixed on the stage portion 151 of the housing 150 accommodating the touch panel 50B.

The touch panel 50B is placed on the stage portion 151 having the frame form supporting the touch panel 50B; thereby the external connection terminals 93B to 96B are contacted with terminals of the free end portion 126B of the flexible cable 124B. When the case 123 is mounted on the touch panel 50B, the seal member 131 presses the touch panel 50B so that the external connection terminals 93B to 96B are connected to the terminals of the free end portion 126B of the flexible cable 124B with pressure. That is, the external connection terminals 93B to 96B are electrically connected to the flexible cable 124B with the pressure in the course of incorporating the touch panel 50B into the information communication apparatus 120B and mounting the case 123.

Besides, the flexible cable 124B may be replaced with a conductive pattern formed on a surface of the housing 150.

Figure 15:
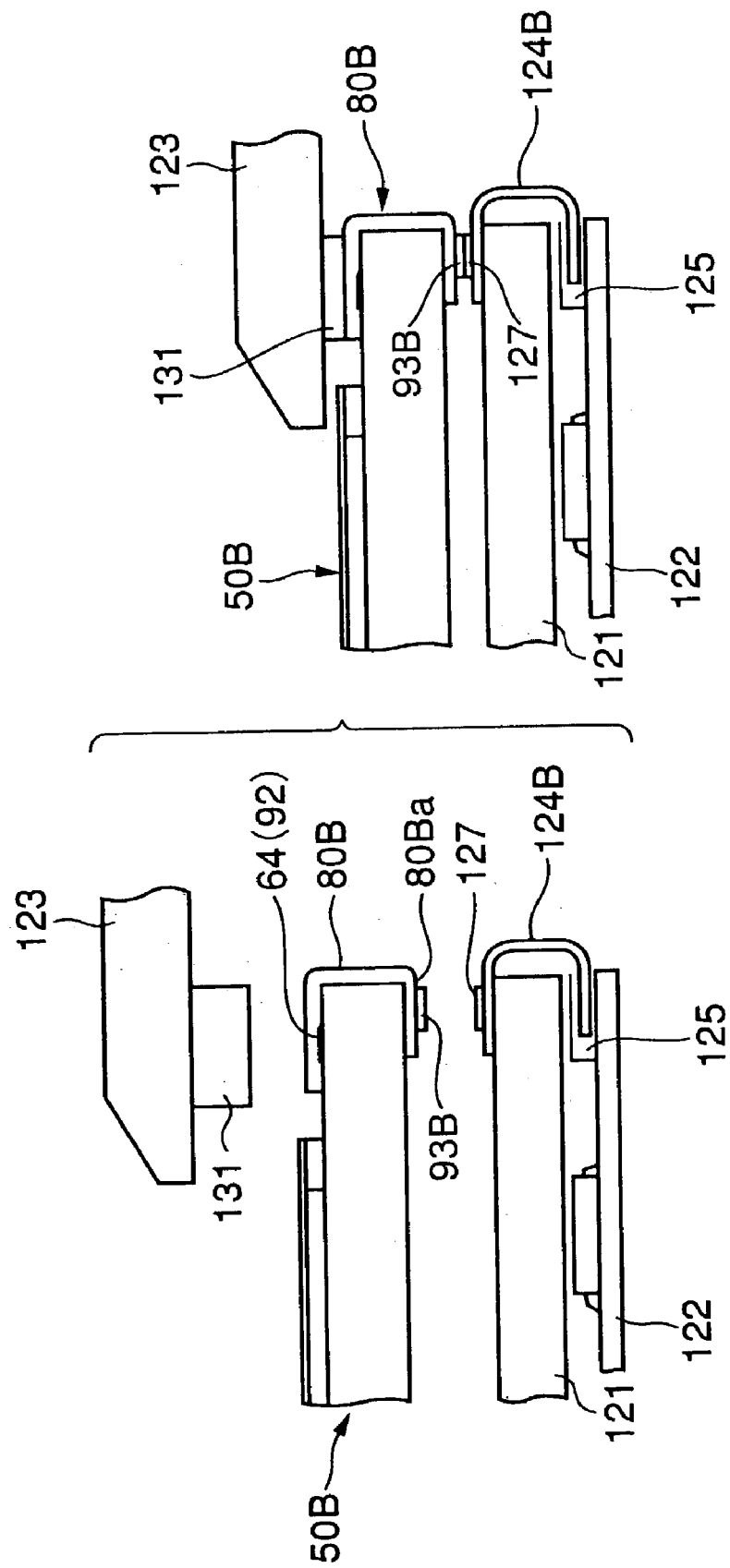
FIG. 15 is a cross-sectional view of a part of another information communication apparatus including the touch panel shown in FIG. 11 and FIG. 12.

Alternatively, as shown in FIG. 15, the external connection terminals 93B to 96B may be electrically connected to the flexible cable 124B with pressure in a state in which the end of the flexible cable 124B is set on an upper surface of the liquid crystal panel 121, and the touch panel 50B is incorporated on the liquid crystal panel 121.

Hereinbelow, a description will be given of other embodiments regarding the handle member.

Figure 16A:
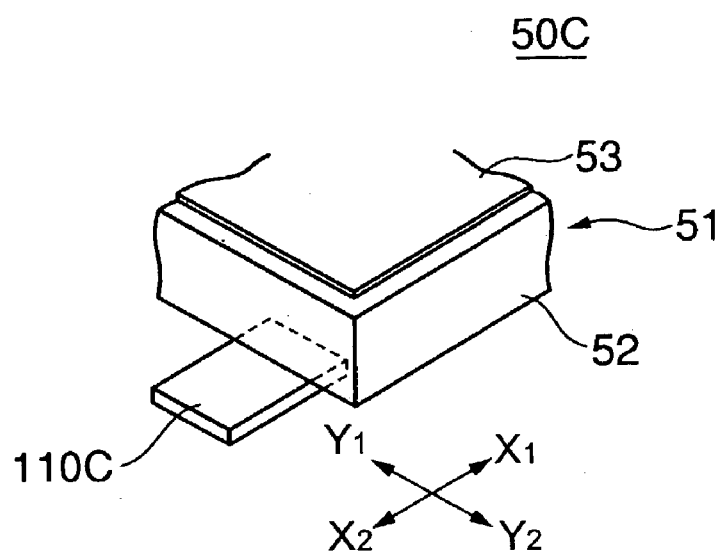
FIG. 16A and FIG. 16B are magnified views of a part of a touch panel according to a fourth embodiment of the present invention.
Figure 16B:
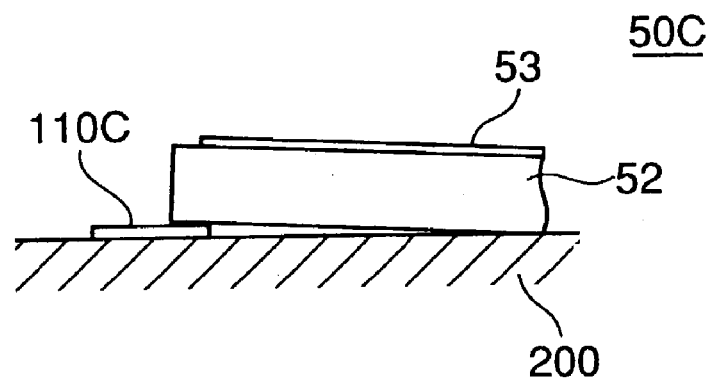

FIG. 16A and FIG. 16B are magnified views of a part of a touch panel 50C according to a fourth embodiment of the present invention. A handle member 110C is applied on the undersurface of the glass plate 52 so as to project in direction X2. As shown in FIG. 16B, a part of the glass plate 52 at which the handle member 110C is applied is separated upward from a table 200; thereby a fingertip can be easily hooked around a side end surface of the glass plate 52. Thus, the touch panel 50C laid on the table 200 can be easily pulled up and held.

Figure 17A:
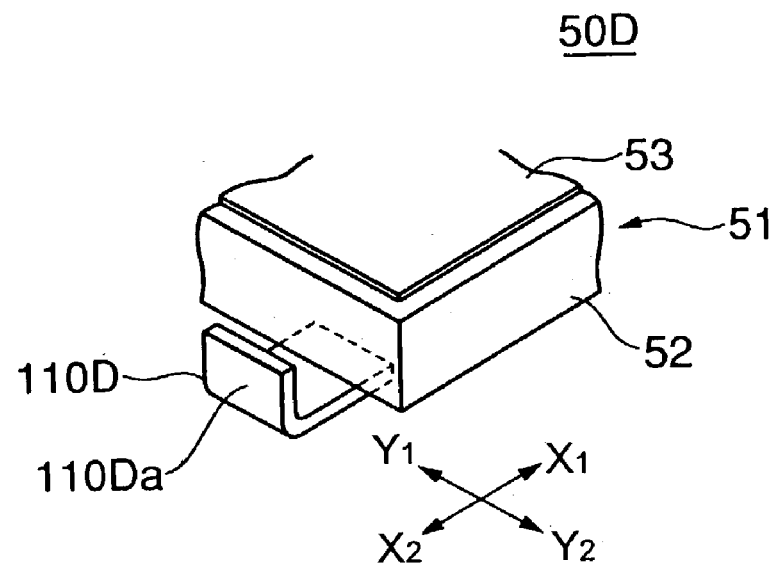
FIG. 17A and FIG. 17B are magnified views of a part of a touch panel according to a fifth embodiment of the present invention.
Figure 17B:
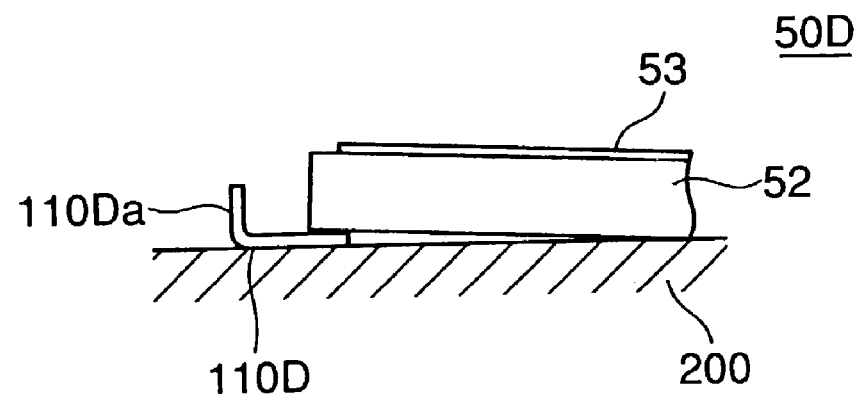

FIG. 17A and FIG. 17B are magnified views of a part of a touch panel 50D according to a fifth embodiment of the present invention. A handle member 110D has an L-shape, and includes a handle portion 110Da bent upward at an end of the handle member 110D. The handle member 110D is applied on the undersurface of the glass plate 52 so as to project in direction X2 as a whole. The touch panel 50D can be pulled up from the table 200 by picking and pulling up the handle portion 110Da with fingertips; thereupon, the touch panel 50D can be held with ease.

Figure 18:
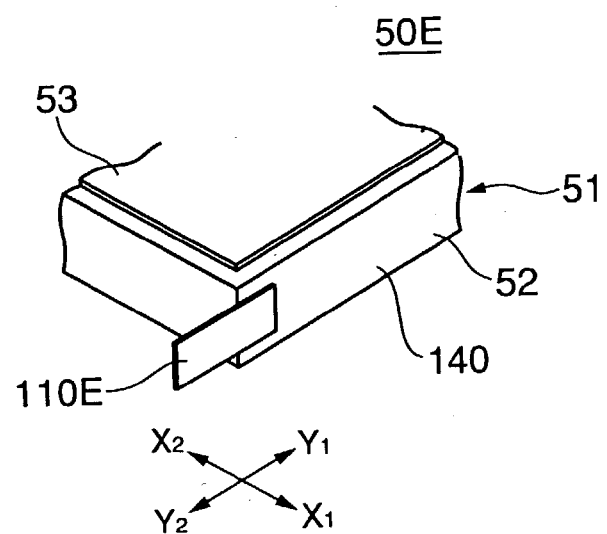
FIG. 18 is a magnified view of a part of a touch panel according to a sixth embodiment of the present invention.

FIG. 18 is a magnified view of a part of a touch panel 50E according to a sixth embodiment of the present invention. A handle member 110E is joined to the side end surface 140 of the glass plate 52 so as to project in direction Y2. The handle member 110E does not increase a thickness of the touch panel 50E.

Figure 19:
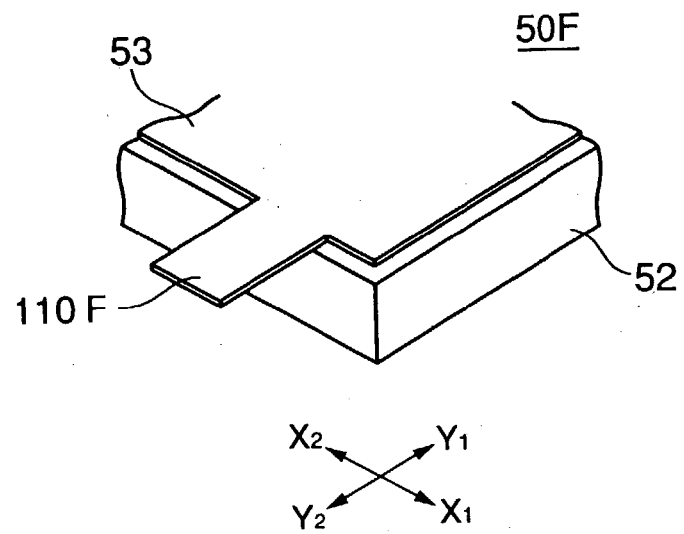
FIG. 19 is a magnified view of a part of a touch panel according to a seventh embodiment of the present invention.

FIG. 19 is a magnified view of a part of a touch panel 50F according to a seventh embodiment of the present invention. A handle portion 110F is made of a projection formed as a part of the film 53. Thus, the handle portion 110F is formed without using a member dedicated exclusively therefor and without increasing a thickness of the touch panel 50F.

Figure 20A:
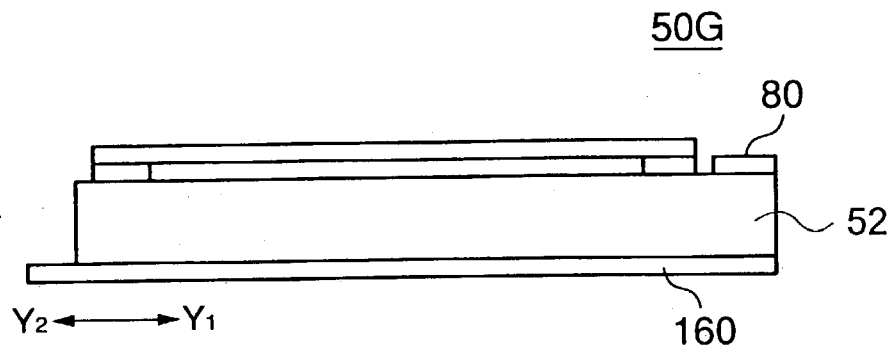
FIG. 20A is a side view of a touch panel according to an eighth embodiment of the present invention.
Figure 20B:
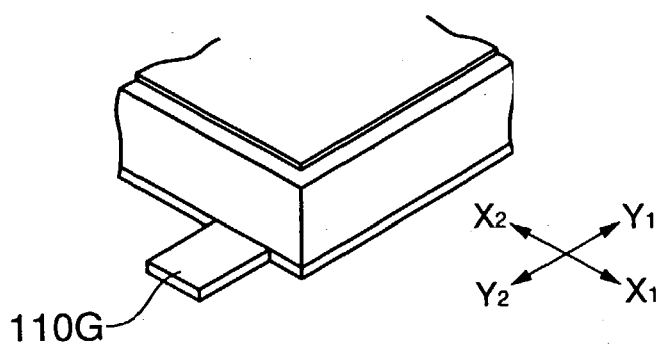
FIG. 20B and FIG. 20C are magnified views of a part of the touch panel shown in FIG. 20A.
Figure 20C:
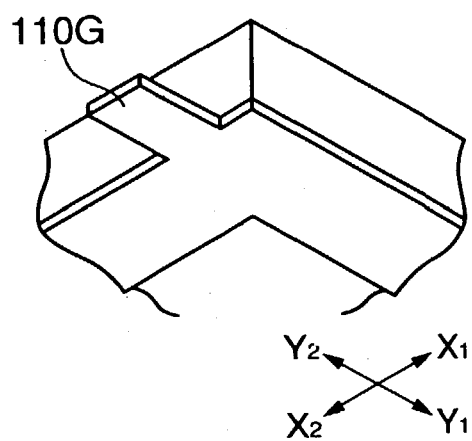

FIG. 20A is a side view of a touch panel 50G according to an eighth embodiment of the present invention. FIG. 20B and FIG. 20C are magnified views of a part of the touch panel 50G shown in FIG. 20A. The touch panel 50G includes an icon sheet 160 joined on the undersurface of the glass plate 52. A handle portion 110G is made of a projection formed as a part of the icon sheet 160. Thus, the handle portion 110G is formed without using a member dedicated exclusively therefor and without increasing a thickness of the touch panel 50G.

Figure 21A:
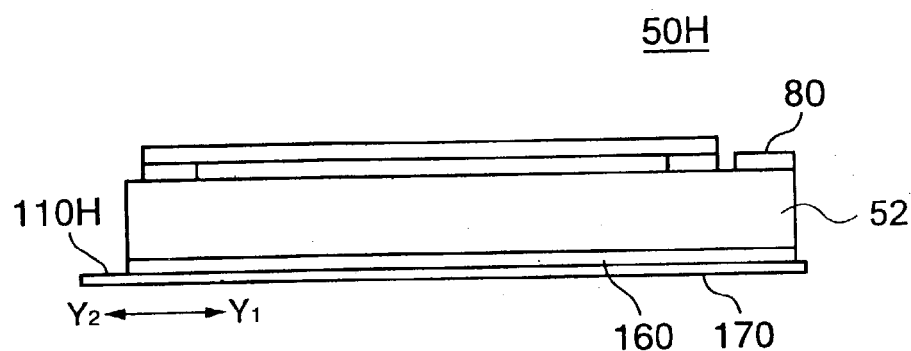
FIG. 21A is a side view of a touch panel according to a ninth embodiment of the present invention.
Figure 21B:
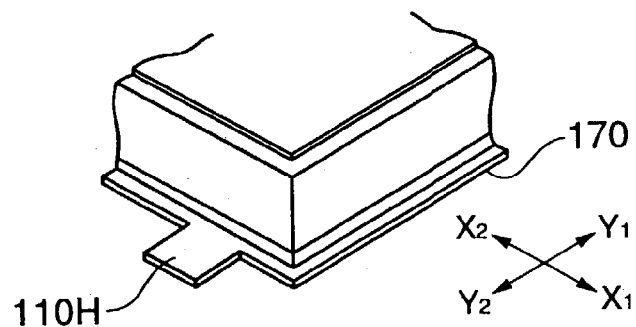
FIG. 21B and FIG. 21C are magnified views of a part of the touch panel shown in FIG. 21A.
Figure 21C:
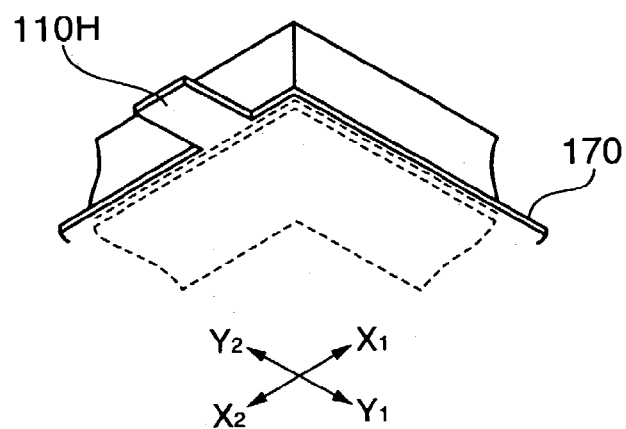

FIG. 21A is a side view of a touch panel 50H according to a ninth embodiment of the present invention. FIG. 21B and FIG. 21C are magnified views of a part of the touch panel 50H shown in FIG. 21A. The touch panel 50H includes the icon sheet 160 joined on the undersurface of the glass plate 52. A handle portion 110H is made of a projection formed as a part of a release paper 170 of the icon sheet 160. Peeling the release paper 170 immediately before incorporating the touch panel 50H into the information communication apparatus removes the handle portion 110H together therewith.

The present invention is not limited to the specifically disclosed embodiments, and variations and modifications may be made without departing from the scope of the present invention.

The present application is based on Japanese priority application No. 2002-298850 filed on Oct. 11, 2002, the entire contents of which are hereby incorporated by reference.

What is claimed is:

1. A touch panel, comprising:
   a touch panel body comprising a plate with a predetermined outline, and a film joined to the plate and providing a face on which an input operation is performed;
   a terminal portion formed on a surface of the plate within the outline; an external connection terminal member having an upper portion received on an upper surface of the plate and opposed to the terminal portion, within the outline of the plate, and a flap portion depending from the upper portion and disposed contiguous to a side end surface of the plate;
   an external connection terminal portion on the upper portion of the external connection terminal member, in pressure connection with the terminal portion on the surface of the plate; and
   plural first external connection terminal portions concentrated in an area on one of an upper surface and an under surface of the plate, within the predetermined outline and neighboring an edge of the plate, wherein
   the external connection terminal member comprises plural first external connection terminal portions provided on an under surface of the upper portion of the flap portion, and plural second external connection terminal portions provided on an outer surface of the flap, respective said first and second external connection terminal portions being electrically connected to each other via corresponding wiring patterns; and
   said external connection terminal member is joined to said touch panel body so that said first external connection terminal portions thereon are electrically connected to respective terminal portions provided on an upper surface of the plate.

2. The touch panel as claimed in claim 1, wherein a plurality of external connection terminal portions are concentrated on the side end surface of the plate.

3. The touch panel as claimed in claim 1, further comprising:
   a handle portion provided on the touch panel body.

4. The touch panel as claimed in claim 3, wherein said handle portion is provided in a predetermined form as a part of a member comprising said touch panel body.

5. The touch panel as claimed in claim 3, wherein said handle portion is provided in a predetermined form joined on a member comprising said touch panel body.

6. The touch panel as claimed in claim 2, further comprising a handle portion provided on said touch panel body.

7. The touch panel as claimed in claim 1, wherein said external connection terminal portion and said terminal portion provided on said touch panel body are connected to each other with pressure.

8. A touch panel apparatus, comprising:
   a touch panel having a touch panel body comprising a plate having a predetermined outline and a surface, on which a film which forms a face on which an input operation is performed, is joined and including external connection terminal portions concentrated in an area, on one of an upper surface and an under surface of the touch panel body, neighboring an edge of said touch panel body; and
   an external connection terminal member having an upper portion received on an upper surface of the plate and opposed to the external connection terminal portions concentrated on the area on one of the upper and under surfaces of the touch panel body, neighboring an edge of said touch panel body, and a flap portion depending from the upper portion and disposed contiguous to a side end surface of the plate and having external connection terminal portions on the upper portion of the external connection terminal member, in pressure connection with respective said external connection terminal portions concentrated on the area on one of the upper and under surfaces of the touch panel body, neighboring an edge of the touch panel body, wherein
   the external connection terminal member further comprises a lower portion extending from, and substantially perpendicular to, the flap portion and in parallel to the upper portion thereof and having plural first external connection terminal portions provided on an under surface of the upper portion and plural second external connection terminals provided on an under surface of the lower portion, respective said first and second external connection terminal portions being electrically connected to each other via corresponding wiring patterns; and
   said external connection terminal member is joined to said touch panel body so that said first external connection terminal portions thereon are electrically connected to respective terminal portions provided on an upper surface of said plate and said second external connection terminal portions thereon extend downwardly from the lower portion to make pressure connections with respective external connection terminal portions disposed beneath the touch panel.

9. A touch panel apparatus, comprising:
   a touch panel having a touch panel body comprising a plate having a predetermined outline and a surface on which a film, which provides a face on which an input operation is performed, is joined and including external connection terminal portions concentrated on a side end portion of the touch panel body;
   an external connection terminal member having an upper portion received on an upper surface of the plate and opposed to the external connection terminal portions concentrated on the area on one of the upper and under surfaces of the touch panel body, neighboring an edge of said touch panel body, and a flap portion depending from the upper portion and disposed contiguous to a side end surface of the plate and having external connection terminal portions on the upper portion of the external connection terminal member, in pressure connection with respective said external connection terminal portions concentrated on the area on one of the upper and under surfaces of the touch panel body, neighboring an edge of the touch panel body, wherein the external connection terminal member further comprises a lower portion extending from, and substantially perpendicular to, the flap portion and in parallel to the upper portion thereof and having plural first external connection terminal portions provided on an under surface of the upper portion and plural second external connection terminals provided on an under surface of the lower portion, respective said first and second external connection terminal portions being electrically connected to each other via corresponding wiring patterns; and said external connection terminal member is joined to said touch panel body so that said first external connection terminal portions thereon are electrically connected to respective terminal portions provided on an upper surface of said plate and said second external connection terminal portions thereon extend downwardly from the lower portion to make pressure connections with respective external connection terminal portions disposed beneath the touch panel.

10. The touch panel apparatus as claimed in claim 7, wherein said touch panel further comprises an external connection terminal member comprising plural first external connection terminal portions provided on an under surface thereof, and plural second said external connection terminal portions provided on an upper surface thereof, said first and second external connection terminal portions being electrically connected to each other via corresponding wiring patterns, wherein said external connection terminal member is joined to said touch panel body so that said first external connection terminal portions are electrically connected to respective terminal portions provided on said touch panel body.

11. The touch panel apparatus as claimed in claim 8, wherein said touch panel further comprises an external connection terminal member comprising plural first external connection terminal portions provided on an under surface thereof, and plural second said external connection terminal portions provided on an upper surface thereof, said first and second external connection terminal portions being electrically connected to each other via corresponding wiring patterns, wherein said external connection terminal member is joined to said touch panel body so that said first external connection terminal portions are electrically connected to respective terminal portions provided on said touch panel body.

12. The touch panel apparatus as claimed in claim 9, wherein said touch panel further comprises an external connection terminal member comprising plural first external connection terminal portions provided on an under surface thereof, and plural second said external connection terminal portions provided on an upper surface thereof, said first and second external connection terminal portions being electrically connected to each other via corresponding wiring patterns, wherein said external connection terminal member is joined to said touch panel body so that said first external connection terminal portions are electrically connected to respective terminal portions provided on said touch panel body.

13. A touch panel, comprising:

a touch panel body comprising a plate with a predetermined outline, and a film joined to the plate and providing a face on which an input operation is performed;

a terminal portion formed on a surface of the plate within the outline; an external connection terminal member having an upper portion received on an upper surface of the plate and opposed to the terminal portion, within the outline of the plate, and a flap portion depending from the upper portion and disposed contiguous to a side end surface of the plate;

an external connection terminal portion on the upper portion of the external connection terminal member, in pressure connection with the terminal portion on the surface of the plate; and plural first external connection terminal portions concentrated in an area on one of an upper surface and an under surface of the plate, within the predetermined outline and neighboring an edge of the plate, wherein the external connection terminal member further comprises a lower portion extending from, and substantially perpendicular to, the flap portion and in parallel to the upper portion thereof and having plural first external connection terminal portions provided on an under surface of the upper portion and plural second external connection terminals provided on an under surface of the lower portion, respective said first and second external connection terminal portions being electrically connected to each other via corresponding wiring patterns; and said external connection terminal member is joined to said touch panel body so that said first external connection terminal portions thereon are electrically connected to respective terminal portions provided on an upper surface of said plate and said second external connection terminal portions thereon extend downwardly from the lower portion to make pressure connections with respective external connection terminal portions disposed beneath the touch panel.

* * * * *